(12) United States Patent
Kim et al.

(10) Patent No.: US 10,210,569 B1
(45) Date of Patent: Feb. 19, 2019

(54) ENCOURAGING SPENDING GOALS AND DISCOURAGING IMPULSE PURCHASES

(71) Applicant: Square, Inc., San Francisco, CA (US)

(72) Inventors: Wesley Kim, San Francisco, CA (US); Jonathan Andrew Wolter, San Francisco, CA (US); Victor Tsou, Oakland, CA (US)

(73) Assignee: Square, Inc., San Francisco, CA (US)

( * ) Notice: Subject to any disclaimer, the term of this patent is extended or adjusted under 35 U.S.C. 154(b) by 742 days.

(21) Appl. No.: 14/747,805

(22) Filed: Jun. 23, 2015

(51) Int. Cl.
*G06Q 30/06* (2012.01)
*G06Q 40/00* (2012.01)
*G06Q 20/20* (2012.01)
*G06Q 20/40* (2012.01)

(52) U.S. Cl.
CPC ............ *G06Q 40/00* (2013.01); *G06Q 20/20* (2013.01); *G06Q 20/40* (2013.01)

(58) Field of Classification Search
CPC .................................................... G06Q 30/06
USPC ......................................................... 705/16
See application file for complete search history.

(56) References Cited

U.S. PATENT DOCUMENTS

| | | | |
|---|---|---|---|
| 4,764,666 A | 8/1988 | Bergeron | |
| 6,144,948 A | 11/2000 | Walker et al. | |
| 6,315,196 B1 | 11/2001 | Bachman | |
| 7,827,108 B2 | 11/2010 | Perlman et al. | |
| 8,041,640 B2 | 10/2011 | Stone | |
| 8,255,278 B1 | 8/2012 | Young et al. | |
| 2002/0198806 A1 | 12/2002 | Blagg et al. | |
| 2005/0116028 A1 | 6/2005 | Cohen et al. | |
| 2005/0194452 A1 | 9/2005 | Nordentoft et al. | |
| 2006/0006223 A1 | 1/2006 | Harris | |
| 2007/0131759 A1 | 6/2007 | Cox et al. | |
| 2008/0301049 A1 | 12/2008 | Dyson | |
| 2009/0114716 A1 | 5/2009 | Ramachandran | |
| 2011/0035320 A1 | 2/2011 | Perlman et al. | |
| 2012/0233015 A1* | 9/2012 | Calman | |
| 2013/0024364 A1 | 1/2013 | Shrivastava et al. | |
| 2013/0138519 A1 | 5/2013 | McKenzie | |
| 2013/0144783 A1 | 6/2013 | Bishop | |
| 2016/0189142 A1 | 6/2016 | Chandru et al. | |

OTHER PUBLICATIONS

10 Simple Ways to Beat Impulse Buying by Trent Hamm, The Simple Dollar, Sep. 22, 2014. (Year: 2014).*

(Continued)

*Primary Examiner* — Russell S Glass
(74) *Attorney, Agent, or Firm* — Lee & Hayes, PC

(57) ABSTRACT

This disclosure describes, in part, techniques for collecting customer information of users at a centralized location and utilizing the information in an intelligent manner to assist customers in improving spending habits and in meeting budgetary goals. In some instances, the centralized location is a payment service that functions to both authorize payment instruments of users for costs of transactions conducted at the merchant, and to collect, generate and propagate budgetary profiles, to make budgetary suggestions and perform budgetary operations with regard to interactions of the merchants and the users.

20 Claims, 11 Drawing Sheets

(56) References Cited

OTHER PUBLICATIONS

Warnick, M., "Think You can't use that your not yet activated credit card? Think Again," Sticker, dated Sep. 23, 2009, Retrieved from Internet URL: http://www.creditcards.com/credit-card-news/sticker-activate-new-credit-card-1282.php , on Aug. 30, 2017, pp. 1-6.
Non-Final Office Action dated Jan. 15, 2015, for U.S. Appl. No. 14/098,336, of Wilson, M., et al., filed Dec. 5, 2013.
Non-Final Office Action dated Sep. 10, 2015, for U.S. Appl. No. 14/098,336, of Wilson, M., et al., filed Dec. 5, 2013.
Non-Final Office Action dated Mar. 24, 2016, for U.S. Appl. No. 14/098,336, of Wilson, M., et al., filed Dec. 5, 2013.
Non-Final Office Action dated Sep. 9, 2016, for U.S. Appl. No. 14/098,336, of Wilson, M., et al., filed Dec. 5, 2013.
Final Office Action dated Feb. 24, 2017, for U.S. Appl. No. 14/098,336, of Wilson, M., et al., filed Dec. 5, 2013.
Non-Final Office Action dated Sep. 27, 2017, for U.S. Appl. No. 14/098,336, of Wilson, M., et al., filed Dec. 5, 2013.
Non-Final Office Action dated Nov. 2, 2017, for U.S. Appl. No. 14/453,526, of Jowdy, J., M., filed Aug. 6, 2014.
Non-Final Office Action dated Nov. 15, 2017, for U.S. Appl. No. 15/640,321, of Grassadonia, B., et al., filed Jun. 30, 2017.

\* cited by examiner

ENCOURAGING SPENDING GOALS AND DISCOURAGING IMPULSE PURCHASES

BACKGROUND

Service providers and merchants continually strive to create the best possible experience for their customers. Despite this, customers may constantly struggle with setting spending goals and/or improving and maintaining spending habits. For instance, customers may struggle to manually create a budget as doing so may be time consuming and maintaining such a budget is also difficult. In addition to the difficultly in creating a budget, many customers may struggle to follow the budget such that spending mistakes, such as impulse purchases are avoided.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 shows example outputs that may be provided to the merchant and customer when budgetary operations are triggered.

DETAILED DESCRIPTION

Figure 1:
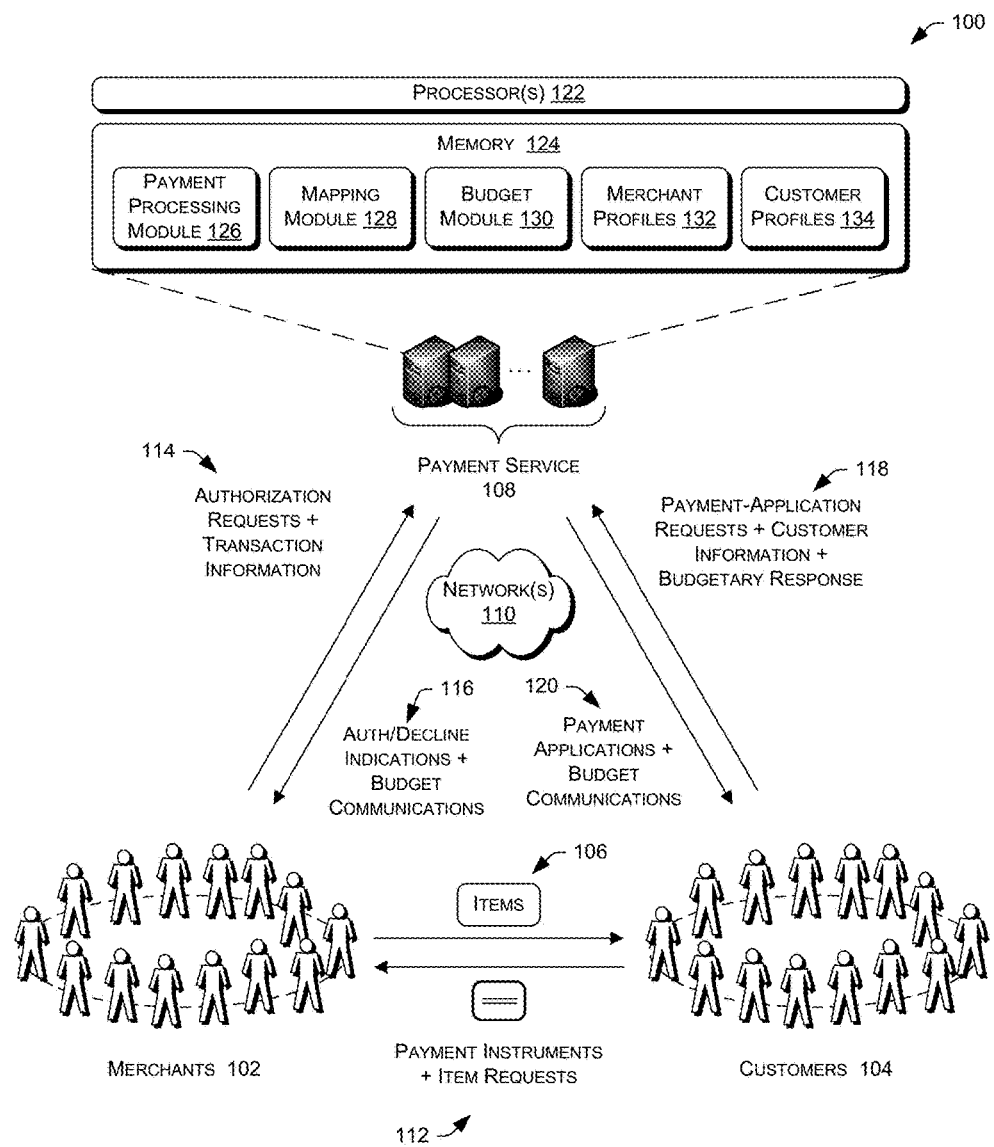
FIG. 1 illustrates an example environment that includes merchants that conduct transactions with customers, as well as a payment service to authorize payment instruments of the customers. In this environment, customers send request for items and item customizations to merchants, who share this information with the payment service. The payment service collects the transaction data and customer data and intelligently operates with the customers to generate budgetary profiles that may be utilized to encourage the customers to follow budgetary goals and improve spending habits.

This disclosure describes, in part, techniques for collecting customer information of users at a centralized location and utilizing the information in an intelligent manner to assist customers in improving spending habits and in meeting budgetary goals. In some instances, the centralized location is a payment service that functions to both authorize payment instruments of users for costs of transactions conducted at the merchant, and collect and analyze the customer information.

In some implementations, the centralized location may collect customer information from various sources such as the customer, a data source associated with the centralized location (e.g. a transaction history database of a payment service acting as a centralized location), or a data source external to the centralized location (e.g. information from a social media website or information from a banking institution not associated with the payment service). The customer information collected may include personal information of customers, employment and payroll information of customers, information regarding recurring bills of customers, information regarding spending habits of customers, social media information of customers, and so on. In some implementations, the customers may be able to customize the information sources, types of information, level of detail and so on that the payment service collects.

As mentioned above, the payment service may collect information from interactions of customers with merchants. To illustrate, a customer (or "user") may engage in a transaction with a merchant for an item offered by a merchant. During the transaction, the customer may request an item and/or request the item be customized in some way. The customization may relate to a size of the item (e.g., tall, 16 oz., large, etc.), a color of the item (e.g., red, blue, etc.), an ingredient to include or not to include in the item (e.g., soy milk, no nuts, etc.), a preparation type of the item (e.g., rare temperature, extra hot drink, etc.), a flavor of the item (e.g., lemon-lime, cherry, etc.), or any other item customization. Throughout this disclosure, discussions are made of customers requesting items and item customizations. However, the term "items" may refer to both items and customizations of items unless explicitly stated otherwise. To pay for the cost of the transaction, the customer may provide cash or a payment instrument (or other consideration) to the merchant. The merchant may then send an indication of the transaction, including the requested item and/or item customizations, to a payment service. In instances where the customer uses a payment instrument to pay for the cost of the transaction, the payment service may also send a request to the payment service to authorize the payment instrument for the cost of the transaction.

Upon receiving the information regarding the transaction, the payment service may identify the customer associated with the transaction. For example, in instances where the merchant sends a request to authorize a payment instrument of the customer, the payment service may identify the customer from the payment instrument. In another example, the merchant may provide an indication of the identity of the customer to the payment service.

In addition to identifying the customer, the payment service may identify the item and/or item customizations associated with the transaction and may store this information in a profile of the customer at the payment service. In some instances, the customer has an existing profile at the payment service, while in instances where the payment service has never identified the customer before, the payment service may create a profile of the customer and associate the item and/or item customizations with the newly created profile. In some instances, the payment service may attempt to authorize the payment instrument for the cost of the transaction and may send an indication to the merchant regarding whether or not the payment instrument has been authorized or declined. Because the payment service may work with a variety of merchants, the payment service may continue to collect item and/or item customization information of customers.

In some instances, a customer may request that the payment service provide a payment application to a device of the customer. This payment application may allow the customer to pay for items at merchants that work with the payment service, and may further include information regarding the merchants (e.g., menus, hours, location, etc.). In response to receiving this request, the payment service may associate an instance of the application provided to the customer device with the device of the customer, with any payment instruments associated with the customer, and with the profile of the customer at the payment service. Therefore, the previously stored information associated with the customer may be associated with the instance of the application executable on the customer device.

Regardless of whether a customer utilizes a payment application from the payment service, the payment service may analyze the collected customer and transaction data to allow the payment service to intelligently propagate budgetary suggestions for customers to merchants and/or customers. For example, continuing the example from above, envision that the customer that has previously purchased a first item with an item customization at a first merchant subsequently indicated that the customer felt that the item customization was an impulse or unnecessary purchase. When the customer later visits a location of a second merchant, the payment service may determine that the customer is located at the second merchant and may perform budgetary operations to encourage the customer to avoid making an impulsive or unnecessary purchase of the item customization from the second merchant. In some instances, the payment services may determine which one or more budgetary operations or suggestions to provide for interactions with the merchant based on the class of item(s) offered by the merchant and the class of items that each budgetary operation is associated with.

For example, envision that a user visits a first coffee shop and orders a latte with an extra shot of mocha. The first merchant may send a request to authorize a payment instrument of the customer for the cost of the latte, along with an itemized receipt. In addition to attempting to authorize the payment instrument of the user, the payment service may identify the "extra shot" item customization, may associate this item customization with "coffee items", and may associate this customization with the profile of the customer. Thereafter, the payment service may follow-up with the customer by requesting the customer indicate which, if any, of the items and/or customizations thereof were impulse purchases or purchases which the customer wishes to avoid repeating. In the current example, the customer may respond with an indication that the "extra shot" was both an impulse purchase and a purchase which the customer wishes to avoid repeating because it was outside the dietary goals of the customer.

Thereafter, the customer may enter an establishment of a second merchant that also offers coffee items. If the customer subsequently requests a latte with an extra shot of mocha from the second merchant, the payment service may determine that the "extra shot" item customization is likely an impulse purchase and, hence, may begin budgetary operations. For example, the payment service may send a budgetary suggestion to a device of the second merchant or to a device of the customer. In some examples, the customer may be presented with a message asking the customer to confirm that the customer wishes to proceed despite previously indicating that a similar purchase was an impulse purchase. As part of the budgetary suggestion, the customer may be presented with an alternate emotional stimulus to reinforce the budgetary suggestion. For example, if the customer desires to save money for a vacation, the budgetary suggestion may be accompanied by an image of the destination the customer desires and the budgetary suggestion may include an option to place an amount equal to the cost of the extra shot in a savings fund for the customer's desired vacation. An alternate emotional stimulus may be a stimulus designed to appeal to an alternate, and typically more beneficial, emotion of the customer besides the emotion that is driving the impulse purchase. For example, if the impulse purchase is a purchase of an "extra shot" item customization being driven by a deleterious self-indulgent emotion, then the alternate emotional stimulus may be the destination image designed to appeal to the beneficial alternate emotion of deferred, wholesome, personal-growth satisfaction. Additionally or alternatively, the merchant may be presented with a budgetary suggestion. For example, the budgetary suggestion may indicate that the merchant should offer an alternative item to the customer in place of the latte with the extra shot. For example, the merchant may be presented with a message to offer an alternate type of drink that, while potentially being cheaper to the customer, may represent a higher profit to the merchant.

In some instances, the payment service may also provide budgetary suggestions to a device of the customer independently of the merchant device. For instance, the device of the customer may request and store a payment application that is executable to allow the customer to order items from merchants, such as the first and second merchants. Upon the customer visiting the second merchant, or upon the customer requesting information regarding the second merchant, the payment application may operate to provide budgetary suggestions to the customer, such as the above discussed suggestion to not purchase the extra shot of mocha in lattes the customer wishes to purchase. In such a scenario, the merchant and/or merchant device may not be involved until the customer finalizes the order after accepting or rejecting the budgetary suggestion. Once the orders finalize, the payment application operated by the customer device may instruct the payment service to push the order to the merchant device. Upon receipt of the pushed order, the merchant may fulfill the customer's order.

The payment service may determine that the customer is present at a merchant location in a number of ways. For instance, when a customer provides a payment instrument to the merchant for a cost of an item ordered by the customer, the device of the merchant may send a request to authorize the payment instrument to the payment service. The payment service may then map this payment instrument to the customer. In another example, the device of the merchant, the device of the customer, or a third device may determine that the device of the customer is proximate (i.e., within a threshold distance of) the device of the merchant. For instance, both the device of the merchant and the device of the customer (e.g., executing the payment application) may share each device's GPS coordinates with the payment service, which may use this information to determine whether the customer is located at the merchant. In yet another example, the customer may utilize a device to "check in" at the merchant via a social network. Of course, while a few examples have been listed, it is to be appreciated that the payment service may determine that the customer is located at the merchant in any number of ways.

In response to determining that the customer is located at the merchant, the payment service may determine whether any of the budgetary information associated with the customer is pertinent to the merchant. If so, then the payment service may determine one or more budgetary operations and/or suggestions to provide to the customer/merchant.

In some instances, the payment service may rank the budgetary operations and/or suggestions based on a measure of priority and may provide one or more of the budgetary suggestions and/or operations based on the priorities thereof. In another example, the payment service may provide all pertinent budgetary suggestions and/or operations. In another example, the payment service may provide only budgetary suggestions and/or operations that are pertinent to items currently being ordered by the customer. For instance, the payment service may only provide the suggestion to remove the "extra shot" of the customer's drink order once the customer actually attempts to order a hot drink with an extra shot from the second merchant. On the other hand, depending on how the payment service determines that the customer is located at the second merchant, the payment service may provide the budgetary suggestions and/or operations upon the customer arriving at the premises of the second merchant, prior to the customer ordering an item, as part of the checkout process for an ordered item, or the like.

For example, a budgetary goal of a customer may be to avoid overspending when the customer goes to bars, and, in particular, that the customer wishes to avoid making unwise decisions when inebriated and to avoid purchasing more than a couple rounds of drinks in general. In such a case, the payment service may determine that a customer has entered a merchant's premises and that the merchant qualifies as a bar. In response to this determination, the payment service may perform budgetary operations to assist the customer. For example, the payment service may implement a spending limit of one hundred dollars ($100) for the customer during the visit to the bar. In addition, the payment service may implement a limit on the number of rounds that can be purchased by the customer and require the customer to complete a sobriety test before each additional item or set of items is ordered. Such limits and tests may be processed by the merchant's device or may be provided by a payment application operating on the customer device. For example, the merchant may be informed by the merchant's device that the customer's payment instrument is limited at $100 and that any rounds of drinks purchased after the second round will be declined. In another example, where the customer utilizes the payment application to request items, the customer may be shown the remainder of the limit available and, should the customer attempt to buy a third round of drinks via the payment application, the payment application may reject the request.

Depending on the implementation, the customer preferences or so on, the types of operations implemented by the payment service may be previously requested types of operations or operations determined dynamically by the payment service. Once the operation has been determined, the customer may be informed of, for example, the spending limit and/or the system may request approval from the customer for the budgetary operation, possibly along with an alternate emotional stimulus. In other examples, the customer's "transaction time" approval may not be requested. For example, the customer may approve the payment service to implement budgetary operations, e.g. the sobriety test, without requesting approval of the customer to avoid the customer overriding the customer's previous intent while inebriated.

Another example budgetary operation that may be performed, for example, for an impulse purchase item, either prior to the checkout process or during the checkout process. In particular, when the payment service determines a purchase is likely impulsive, the payment service may offer to pause the order of the customer's entire order or of a particular item and indicate that the items can be delivered to the customer later if the customer still desires to purchase the item after a holding period. This may reduce the "now or never" impetus of many impulse purchases. For example, such a "now or never" feeling may arise when the customer is worried the customer will not be able to obtain the item within a reasonable period if the customer does not purchase the item now. This urgency often causes customers to fail to follow budgetary goals. In other cases, allowing the customer to delay, even for a short period, may allow the customer overcome the impulse to purchase an unnecessary item. In some such examples, the payment service may maintain an open order for the item for a length of time if the customer accepts this offer. For example, if a customer at a warehouse store merchant adds a popcorn machine to the customer's ticket, the payment service may interrupt the payment process and indicate that, if the customer postpones the purchase of the popcorn machine, the customer may complete the purchase anytime in the next two days and have the popcorn machine delivered to the customer for free.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes merchants 102 that conduct transactions with customers 104 (or "users 104") for items 106 offered by the merchants 102. FIG. 1 also illustrates a payment service 108, coupled to merchant devices and customer devices via a network 110, to authorize payment instruments of the customers 104.

As illustrated, individual ones of the customers 104 may engage in transactions with the merchants 102 to obtain items 106. The customers may provide, as shown at 112, cash or payment instruments to the merchants along with requests for items offered by the merchants. These requests may include requested customizations, such as a requested size, flavor, ingredients, preparation, or the like. Such customizations may incur additional costs over the cost of the uncustomized items.

The merchants may utilize respective point-of-sale (POS) devices (see FIGS. 2, 10) for accepting payment from the customers 104. The POS devices may comprise any sort of mobile or non-mobile devices that include instances of a merchant application that executes on the respective devices. The merchant application may provide POS functionality to the POS device to enable the merchants 102 (e.g., owners, employees, etc.) to accept payments from the customers 104. In some types of businesses, the POS device may correspond to a store or other place of business of the merchant, and thus, may be a fixed location that typically does not change on a day-to-day basis. In other types of businesses, however, the location of the POS device may change from time to time, such as in the case that a merchant operates a food truck, is a street vendor, is a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between one of the customers 104 and one of the merchants 102. For example, when paying for a transaction, the customer can provide the amount that is due to the merchant using cash or other payment instrument (e.g., a debit card, a credit card, a stored-value or gift card, a check, through an electronic payment application on a device carried by the customer, or the like). The merchant can interact with the POS device to process the transactions, such as by inputting (e.g., manually, via a magnetic card reader or an RFID reader, etc.) identifiers associated with the payment instruments. For example, a payment instrument of the customer may include one or more magnetic strips for providing card and customer information when swiped in a card reader. In other examples, other types of payment cards may be used, such as smart cards having a built-in memory chip that is read by the device when the card is "dipped" into the reader, a radio frequency identification tag, or so forth.

During the transaction, the POS device can determine transaction information describing the transaction, such as the identifier of the payment instrument, an amount of payment received from the customer, the item(s) requested and/or acquired by the customer, item customization(s) requested and/or acquired by the customer, a time, place and date of the transaction, a card network associated with the payment instrument, an issuing bank of the payment instrument, a name of the customer, contact information of the customer, and so forth. The POS device can send the transaction information to the payment service 108 over a network 110, either substantially contemporaneously with the conducting of the transaction (in the case of online transactions) or later when the device is in the online mode (in the case offline transactions).

In an offline transaction, the POS device may store one or more characteristics associated with the transaction (i.e., the transaction information), such as a cost of the transaction, a time of day at which the transaction occurred, a day of the week at which the transaction occurred, a location at which the transaction took place, the item(s) requested and/or acquired by the customer, item customization(s) requested and/or acquired by the customer, an identity and/or contact information of the customer, and a payment instrument used in the transaction. After conducting an offline transaction with one of the customers 104, the POS device may provide the stored information (or some subset of it) to the payment service 108 over the network 110. The network 110 may represent any one or more wired or wireless networks, such as a WiFi network, a cellular network, or the like. In an online transaction, the POS device may send this information to the payment service 108 over the network 110 substantially contemporaneously with the transaction with the customer.

After the merchants 102 receive the payment information from the customers 104, the merchants may send respective authorization requests, along with information regarding the respective transactions, to the payment service 108, as illustrated at 114. The payment service 108 may include one or more processors 122 and memory 124, which may store a payment processing module 126, a mapping module 128, a budget module 130, one or more merchant profiles 132, and one or more customer profiles 134 (also referred to herein as "profiles" or "budgetary profiles").

The payment processing module 126 may function to receive the information regarding a transaction from the POS device of a merchant and attempt to authorize the payment instrument used to conduct the transaction. The payment processing module 126 may then send an indication of whether the payment instrument has been approved or declined back to the POS device, potentially along with one or more budgetary communications, as illustrated at 116.

Generally, when a customer and a merchant enter into an electronic payment transaction, the transaction is processed by electronically transferring funds from a financial account associated with the customer to a financial account associated with the merchant. As such, the payment processing module 126 may communicate with one or more computing devices of a card network (or "card payment network"), e.g., MasterCard®, VISA®, over the network 110 to conduct financial transactions electronically. The payment processing module 126 can also communicate with one or more computing devices of one or more banks, processing/acquiring services, or the like over the network 110. For example, the payment processing module 126 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In addition to attempting to authorize a payment instrument of a user, the payment service 108 may identify, from the transaction data associated with a particular transaction, item(s) and/or item customization(s) ordered by the customer. For instance, the transaction data may indicate, continuing the example above, that the user ordered the latte with an "extra shot". The mapping module 128 may map the payment instrument of the user to an identity of the user (e.g., using a name on the instrument) and may store this information in a profile of the user maintained in the customer profiles 134. While FIG. 1 illustrates the merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process. Again, in these instances, the mapping module 128 may map the transactions, and the item(s) and/or item customization(s) therein, to the corresponding customer profiles.

While the customer profiles 134 may store indications of customer's transaction histories, the merchant profiles 132 may store information associated with respective ones of the merchants 102. For instance, the merchant profiles 132 may indicate a class of items offered by respective merchants (e.g., coffee items, collectibles, apparel, etc.), a type of business of the merchant (e.g., restaurant, coffee shop, retail store, etc.), a geographical location of the merchant, and the like.

After the payment service 108 associates an item or item customization to a corresponding customer profile of the customer, the payment service 108 may utilize this information when the customer visits the same merchant or a different merchant in any number of ways. For example, the payment service 108 may utilize the transaction history of the customer profile to provide merchants with preferences of the customers, to de-anonymize customers based on requested items before other identification is provided to the payment service or merchant device and to determine budgetary information and make budgetary suggestions.

For instance, envision that the customer described above has ordered a latte with an extra shot of mocha from a first merchant, who has communicated this item customization to the payment service 108. In response, the payment service 108 associates this item customization with the profile of the customer. Thereafter, envision that the customer visits a second, different merchant. In response to determining that the customer is located at the second merchant, the payment service 108 may determine whether to provide any previously stored item customizations of the user to the second merchant. To do so, the payment service 108 may determine, for each customization, a class of items to which the item customization is pertinent to and may determine whether the second merchant offers any of the classes of items associated with the item customization of the customer. If so, then the payment service 108 may send the respective item customization to the second merchant (but may refrain from non-pertinent item customizations). In the instant example, for instance, the payment service 108 may send the item customization of "extra shot of mocha" to the second merchant in instances where the second merchant offers coffee items (or is labeled as a coffee shop or the like), but may refrain from doing so if the second merchant is, for example, a shoe store.

Returning to the use of transaction data to de-anonymize customers, envision that a customer has visited one or more grocery merchants who have communicated the purchased items and item customization to the payment service 108. In response, the payment service 108 associates the items and item customization with the profile of the customer. Thereafter, envision that the customer visits a second, different merchant. The payment service 108 may analyze the purchases of the customer and determine patterns in the customer's items to allow for future identification of the customer when the customer makes similar purchases in the future. For example, when the customer visits another merchant and reaches a point in the merchant-customer interaction where itemization information is provided to the payment service, the payment service may utilize the itemization information and previously determined customer information to identify the customer. For example, once the payment service has determined the identity of the customer to some degree of confidence, the payment service may send a message to the customer such as, "It looks like you are purchasing milk and nine other items. We will charge you unless you replay NOTME." Additional information may be utilized in de-anonymizing the customer. For example, the payment service may utilize the time of the purchase, the contemporaneous presence of the customer device at the merchant location, and any other information to determine the identity of the customer.

Returning to the use of transaction data to determine budgetary suggestions and operations, the payment service may collect information on the users' spending patterns and transaction history and utilize this information. For example, the payment service, and particularly, the budgetary module, may analyze the transaction histories of a plurality of customers and determine spending habits among the customers at various levels of detail. For example, the payment service may determine spending habits for particular items among specified subsets of customers (e.g., amount spent on coffee among users in a particular income range who also meet their budgetary goals). The payment service may further determine a specific customer's spending habits. For example, the payment service may determine that the particular customer has a habit of spending over $300 whenever the customer patronizes a dance club on Friday and Saturday nights and that a substantial portion of the spending in such clubs is due to purchasing rounds for other patrons. The payment service may further determine that the customer has a habit of paying for meals for everyone in the customer's party whenever the customer patronizes restaurants with friends and co-workers. Based on this information, the payment service may suggest that the customer stop or limit these expenditures. For example, the payment service may suggest that the customer limit the purchasing of rounds to one or two rounds per night and the number of occasions on which the customer picks up the bill for the customer's entire party at restaurants to twice per month. If the customer agrees with the budgetary suggestions, the payment service may further perform budgetary operations to assist the customer in implementing the service's suggestions. For example, the payment service may detect when the customer is at a dance club or when transaction data related to the customer is received from a dance club merchant and trigger budgetary operations in response to the detection. In a particular example, when the customer is detected as having entered the dance club, the payment service may push a message to the customer reminding the customer that the customer has committed to not buying more than two rounds. In addition, whenever the customer opens a ticket with the dance club merchant, the payment service may notify the dance club merchant to not allow the customer to order more than two rounds unless the customer provides an override. In addition, the payment service may place a spending limit on the ticket opened by the customer in an amount equal or near the cost of the customer's own drinks when the customer patronizes dance clubs. In the case of the customer patronizing a restaurant, the payment service may initially decline transactions of the customer outside of the budgetary profile and/or suggestions accepted by the customer and instead instruct the customer to request the other members of the customer's party contribute to the cost of the ticket. In some implementations, the payment service may instead offer to communicate with the devices of other customers in the original customer's party to request that the other customers contribute to payment of the ticket. This option to split the bill may operate using various small area networking and low energy networking technologies to detect customer devices of the other customers and to communicate the request that those customers contribute to the ticket.

If the customer wishes to override the budgetary operations, the payment service may request the customer perform some task intended to allow the customer to more fully consider the choice. For example, the payment application operating on the customer device may request that the customer build a logical argument to justify the purchase of a particular item or the purchase of the items in the transaction despite the budgetary considerations that are being overridden. The interface used could be similar to a game interface and present the customer with logical building blocks that can be interlocked and associated with needs, wants and goals in a manner that justifies the purchase by showing that the purchase is important and sufficiently warranted. Many customers, when presented with the task of creating a logical argument in this way, will more fully consider the purchase and abandon the purchase altogether if it is an impulsive or unnecessary purchase.

In some cases, the budgetary module may issue budgetary communications for a purpose other than discouraging transactions. As previously mentioned, the budgetary module may For example, the budgetary module may congratulate the customer that the customer has done really well meeting the customer's budgetary goals and dietary goals by not buying any snacks or candy in several recent transactions. In addition, the budgetary module may suggest the customer have a healthy treat, buy a toy for the customer's child, or take advantage of some promotional offer that is in-line with the customer's goals.

The payment service 108 may determine that the customer is located at the merchant in a number of ways. For instance, if the customer engages in a transaction with the merchant and provides a payment instrument to the second merchant for satisfying a cost of the transaction, then the payment service 108 may map the payment instrument to the customer and, hence, may deduce that the customer is located at the merchant. At that point, the payment service 108 may begin budgetary operations with regard to the customer and/or with reference to the merchant profile of the merchant.

In other instances, a computing device associated with the merchant (e.g., a POS device, servers of the merchant, etc.) determines when the customer visits physical premises or a digital presence of the merchant. For instance, the device of the customer may include an application (e.g., an application provided by the payment service 108) that communicates with the POS device of the merchant via near-field communication methods (e.g., Bluetooth, etc.). Therefore, when the customer visits the physical premises of the merchant, for example, the POS device may detect the presence of the customer device. The POS device may accordingly determine that the customer is present. In another example, one or both of the POS device and the customer device may share its location (e.g., GPS coordinates) to one another or to a common service for determining when the devices are located within a threshold proximity of one another.

In another example, the customer may utilize the customer device to "check in" at the merchant location, and the POS device may receive an indication of this check in. When the customer visits a digital presence of the merchant (e.g., a website, etc.), the customer may log in or otherwise provide information (e.g., a cookie on the device) from which the merchant determines that the customer is at the merchant. Of course, while a few examples are listed, it is to be appreciated that the merchant and/or the payment service 108 may determine when the customer is present at the merchant in any other number of ways. In each instance, after the payment service 108 receives an indication that a particular customer is located at the merchant, the payment service 108 may determine whether to begin budgetary operations with regard to the merchant-customer interaction.

In addition, after engaging in transactions with the merchants 102, one of the customers 104 may desire to receive an instance of a payment application from the payment service 108. FIG. 1 illustrates, at 118, that the customers 104 may send respective payment-application requests to the payment service 108. In response, at 120, the payment service 108 may provide respective instances of the application back to the customer devices. In addition, the payment service 108 may map an identification of the instance of the application to the customer's profile, such that budgetary operations may be performed for the respective customer via the respective instance of the application on the respective customer device. For instance, if a user has created budgetary goals pertinent to the merchants 102, any budgetary operations that are pertinent to the merchant may be associated with the instance of the payments application. By associating these budgetary operations with the payment application of the customer, when the customer utilizes the application to order items from the merchants, the payment application may allow for the receipt of budgetary communications by the customer device and for sending budgetary responses to the payment service.

The discussion provided above of the system shown in FIG. 1 is merely to provide examples of the operation of the system. However, implementations herein are not limited to the particular examples provided, and may be extended to other environments, other system architectures, other types of merchants, and so forth, as will be apparent to those of skill in the art in light of the disclosure herein.

Figure 2:
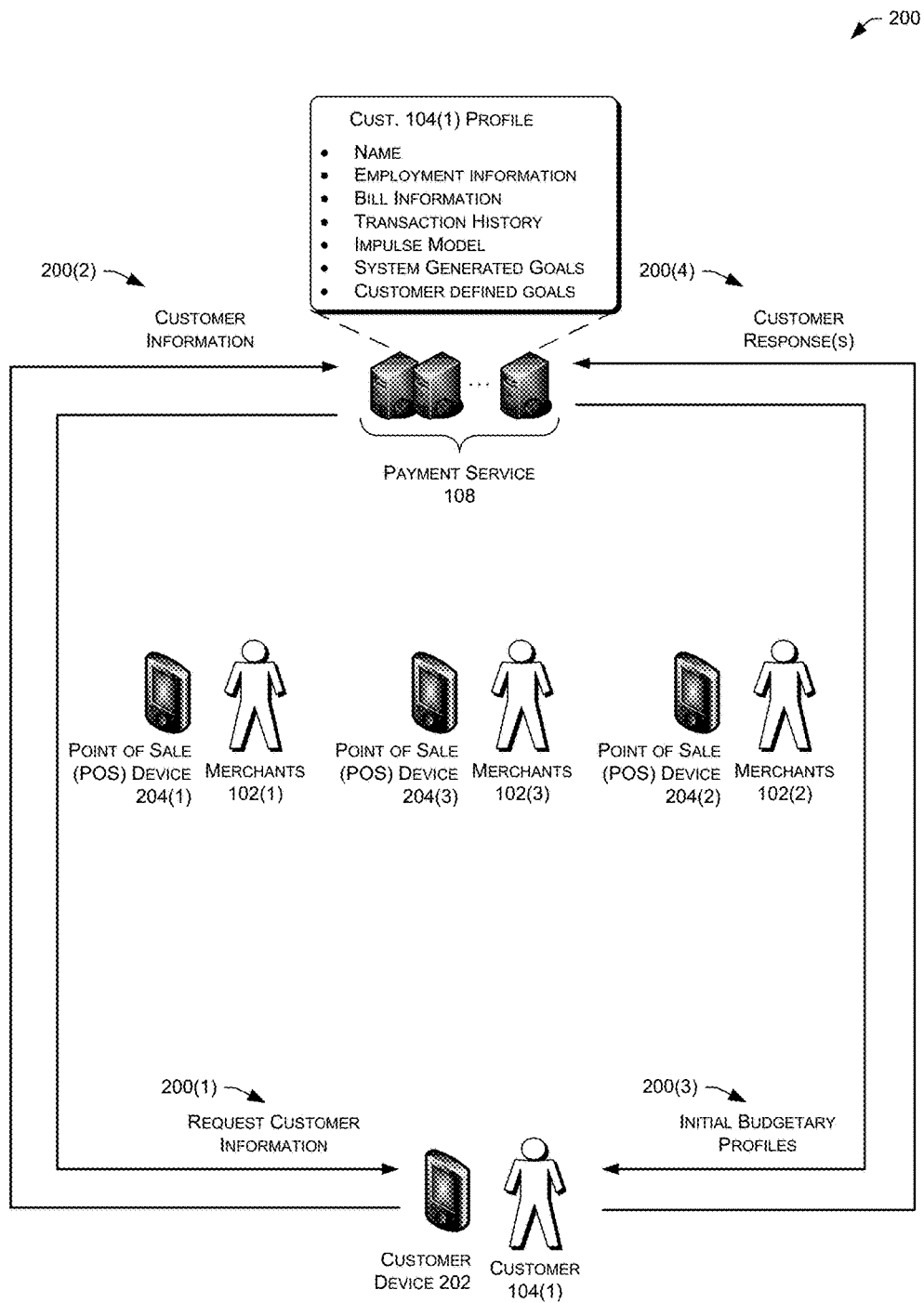
FIG. 2 illustrates a scenario where a customer interacts with a payment service to establish a budgetary profile for the customer.

FIG. 2 illustrates a scenario 200 where a customer 104(1) utilizes a customer device 202 to establish a customer profile including budgetary information with the payment service 108.

First, prior to the communications illustrated in FIG. 2, the customer 104(1) may initiate the process to create the customer profile by communicating with the payment service 108 or the payment service 108 may initiate an interaction with the customer device 202 to establish the customer's profile. Once the process is initiated, and as illustrated at 200(1), the payment service 108 requests customer information from the customer 104(1). As illustrated at 200(2), the customer 104(1) (who is associated with a customer device 202) may provide customer information to the payment service for use in generating the customer's profile. The information provided by the customer may include any number of items. For example, the customer may provide the customer's name, employment information (e.g. pay dates, earnings per paycheck, employer, job title, time employed, etc.), bill information (e.g. amounts due and due dates for utility bills, credit card bills, car loans, mortgages, etc., available credit on credit accounts and so on), social networking information (e.g. access information for the customer's social networking accounts and the like).

In addition, the payment service 108 may operate to collect transaction history information and other information regarding the customer from internal or external sources. For example, the payment service 108 may collect transaction history information regarding previous transactions of the customer using a payment instrument the customer provided as part of the customer information at 200(2) from a data source associated with the payment service 108. In a particular example, the payment service may collect item and item customization data of transactions of the customer for use in determining purchasing trends of the customer. In addition, the payment service may collect information from social networking services of the customer, which may subsequently be used to determine possible budgetary goals for the customer.

Once this information is obtained from the customer, the budgetary module 130 of the payment service 108 may operate to analyze the information to determine an initial budgetary profile for the customer. In particular, the payment service may determine information such as: whether the customer has spending patterns that are negative or positive on certain days of the week or month, or seasons, or time of the day; whether the customer has spending patterns that are negative or positive with regard to particular situations or types of merchant-customer interactions, what types of items the customer purchases, account balance trends throughout the course of months, weeks or time periods between paychecks and so on.

Once the customer information is analyzed, the budgetary module 130 may send the initial budgetary profile created for the customer (e.g. proposed budgetary goals, suggested changes in the customer's spending habits, proposed budgetary operations for the customer, propose modes of contact, etc.) at 200(3). For example, the budgetary module 130 may analyze the social network information collected for the customer and determine the customer has an interest in European architecture and has previously posted messages on social networking sites that the customer would like to visit Europe. Based on this information, the budgetary module 130 may suggest a budgetary goal of saving money for a trip to Europe. Should the user accept this suggestion, the budgetary module 130 may set up a savings account or other means of setting aside funds for such a trip. In another example, the budgetary module 130 may determine that the customer's spending habits show an unusually high amount is being spent on coffee. Such a determination may be based on an analysis of the spending habits of various populations of customers (e.g. general or specialized populations). For example, the budgetary module 130 may compare the spending habits of the customer to the spending habits of other customers in the same geographic area with similar incomes and similar demographic information (e.g. household size, age, etc.). Continuing the above example, upon comparing the spending habits of the specified population of customers to the spending habits of the customer 104, the budgetary module 130 may determine that the customer's coffee expenditures are higher than a threshold value (e.g. an unusually high expenditure level such as the $95^{th}$ percentile) and suggest that the customer reduce the amount spent on coffee to improve the customer's finances. In some examples, the population used may be tailored to reflect the spending habits of other customers who, based on the information known to the payment service, appear to have been successful. For example, the population used for comparison may be filtered to those customers who had a similar financial situation in the past five years but who have seen a rapid improvement in earnings, savings, job status, or the like.

In another example of the budgetary suggestions provided at 200(3), the budgetary module 130 may provide the customer with a list of potential budgetary operations that the budget module 130 may perform during transactions of the customer. For ease of understanding, budgetary operations may be discussed in the context of the following categories: operations occurring prior to a checkout process; operations occurring during the checkout process; and operations occurring after checkout. Some examples of operations occurring prior to the checkout process are (1) sending the customer a reminder that the customer does not want to spend more than a certain amount in a bar along with an alternate emotional stimulus when the payment service 108 detects the customer entering the bar and (2) blocking a request to add an impulse purchase item to a ticket of a customer in the payment application on the customer device and notifying the customer that the item is not within the customer's budgetary goals or profiles. Some examples of operations occurring during a checkout process are (1) detecting that a customer is about to pay a restaurant bill for entire party, interrupting in the payment process, presenting the consumer with the option to "split the bill" with other members of the party and requesting funds from the other members of the party automatically if the customer accepts option and (2) prompting the consumer with an option to replace an impulse purchase item with another item that is within the customer's budgetary profile during the checkout process. Some examples of operations occurring after the checkout process are (1) prompting the customer with a message requesting that the customer evaluate the customer's feelings regarding a purchase outside of the customer's budgetary profile along with an alternate emotional stimulus, (2) prompting the customer to provide an evaluation of whether one or more items the customer purchased were impulse purchase items and (3) prompting the customer of message congratulating the customer for meeting budgetary goals and or other goals, for example, a dietary goal.

Implementations are not limited with regard to the budgetary operations that may be provided by the budgetary module 130. Variations on the examples provided throughout this disclosure would be apparent to one of ordinary skill in the art in view of this disclosure. For example, in addition to handling other types of goals like dietary goals, the budgetary goals are not limited to savings. A customer may have a goal of spending money for going to restaurants to entertain and build friendships. As such, the budgetary module may operate to encourage. For example, the budgetary module may prompt the customer at the time of purchase whether the customer is dining with friends and, if so, suggest that the customer pay for the meals of the other customers.

Once the customer has received the initial budgetary profile, as shown at 200(4), the customer may provide customer responses that include feedback that, for example, add budgetary goals, approve, modify or remove suggestions of the budgetary module 130, provide additional information, and so on. Upon receiving the customer responses, the budgetary module 130 may adapt the initial profile to generate the customer's budgetary profile.

Figure 3:
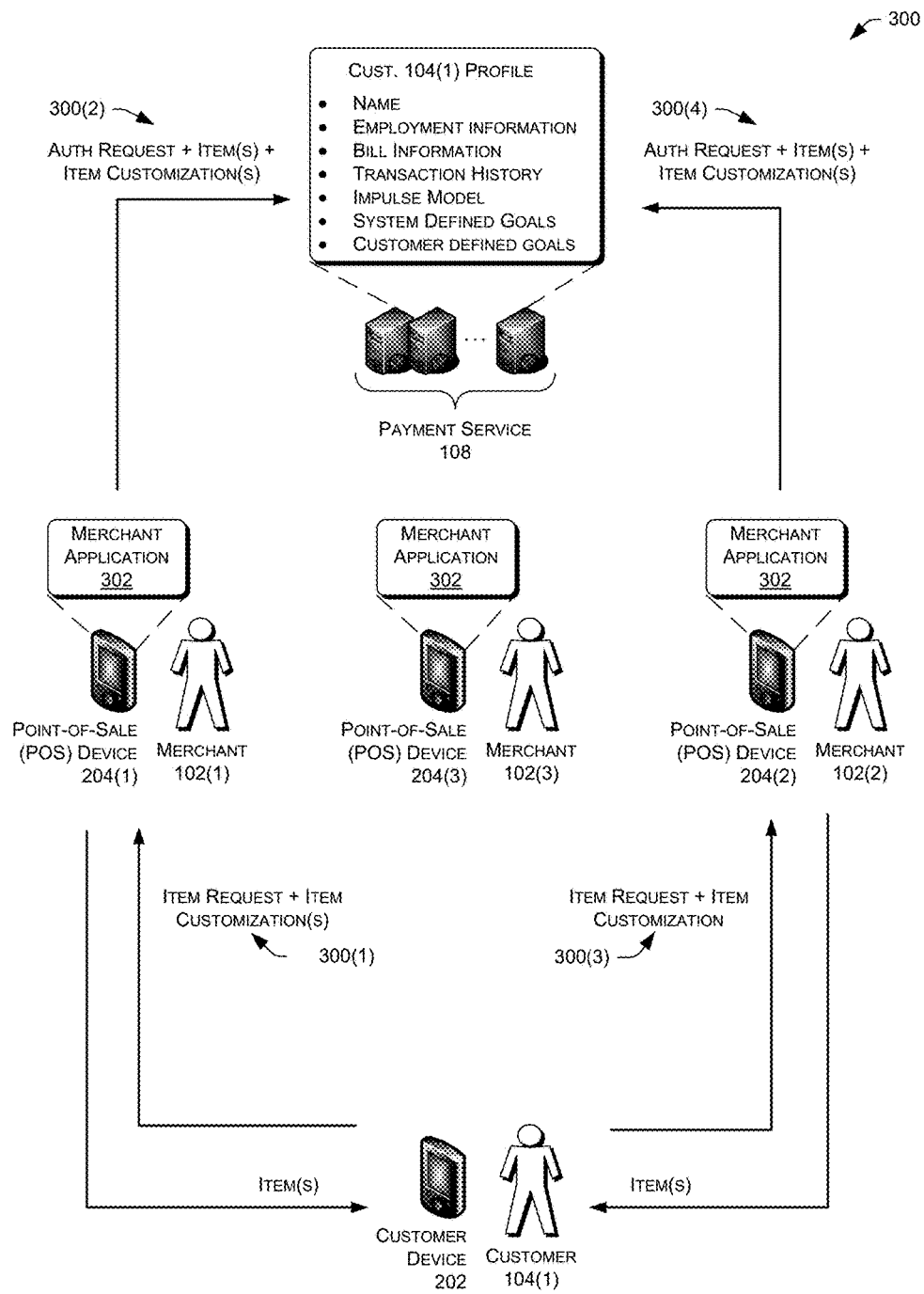
FIG. 3 illustrates a scenario where the payment service builds a transaction history, for example, based on customer requests by the customer for items and/or item customizations when engaging in a first transaction with a first merchant and when engaging in a second transaction with a second merchant. The merchants provide this information to the payment service, which stores this information in a profile of the user.

FIG. 3 illustrates a scenario 300 where the payment service 108 collects transaction data of the customer 104(1) as the customer engages in a first transaction with a first merchant 102(1) and in a second transaction with a second merchant 102(2). The merchants provide this information to a payment service 108, which stores this information in a profile of the user.

First, and as illustrated at 300(1), the customer 104(1) (who is associated with a customer device 202) may request an items from the merchant 102(1) and may express a customization to the items. A POS device 204(1) of the merchant 102(1) may receive the request for the items and the item customizations and may provide, via a merchant application and at 300(2), a request to authorize a payment instrument of the customer 104(1) to the payment service 108, along with the requested items and item customizations. In instances where the customer 104(1) provides cash, meanwhile, the POS device 204(1) may simply send an indication of the item and item customizations to the payment service 108. In addition to attempting to authorize the payment instrument of the customer 104(1), the payment service 108 may identify the customer 104(1) and may store an indication of the requested items and item customizations in association with a profile of the customer 104(1) at the payment service. In the above discussed examples, for instance, the customer 104(1) ordered a latte with an extra shot of mocha from the merchant 102(1) and, in response, the payment service 108 stores an indication of the items and item customizations requested by the user.

Next, the customer 104(1) visits the second merchant 102(2). As illustrated at 300(3) and 300(4), the customer 104(1) repeats the process at the second merchant 102(2) and the payment service adds the items and item customizations requested by the customer from the second merchant to the transaction history of the customer's profile.

Figure 4A:
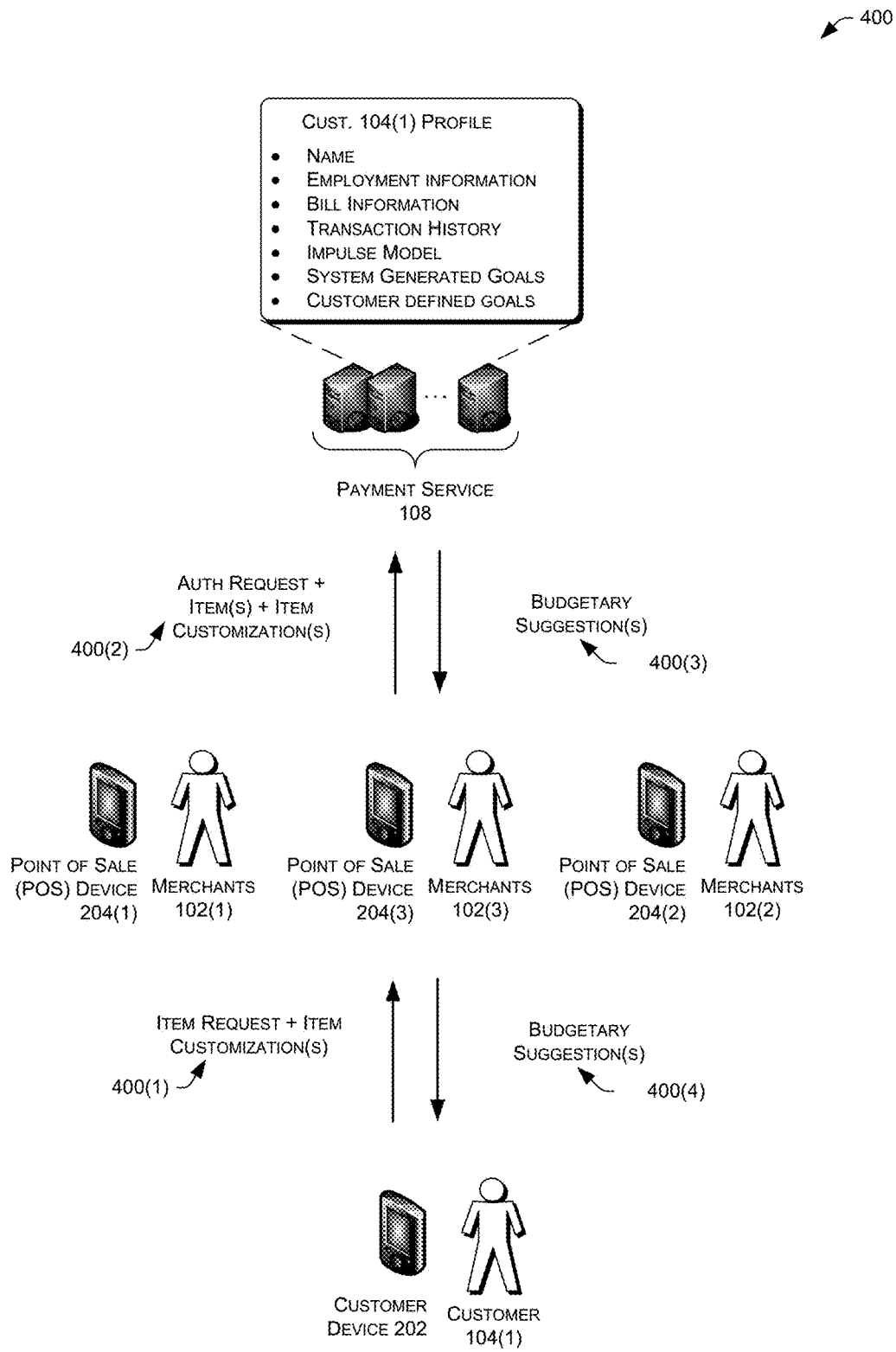
FIGS. 4A and 4B illustrate a scenario where a customer receives budgetary suggestions from a payment service, via a POS device of a merchant, during a transaction with the merchant. The customer may respond to the budgetary suggestions and the payment service implements budgetary operations based on the customer's response.
Figure 4B:
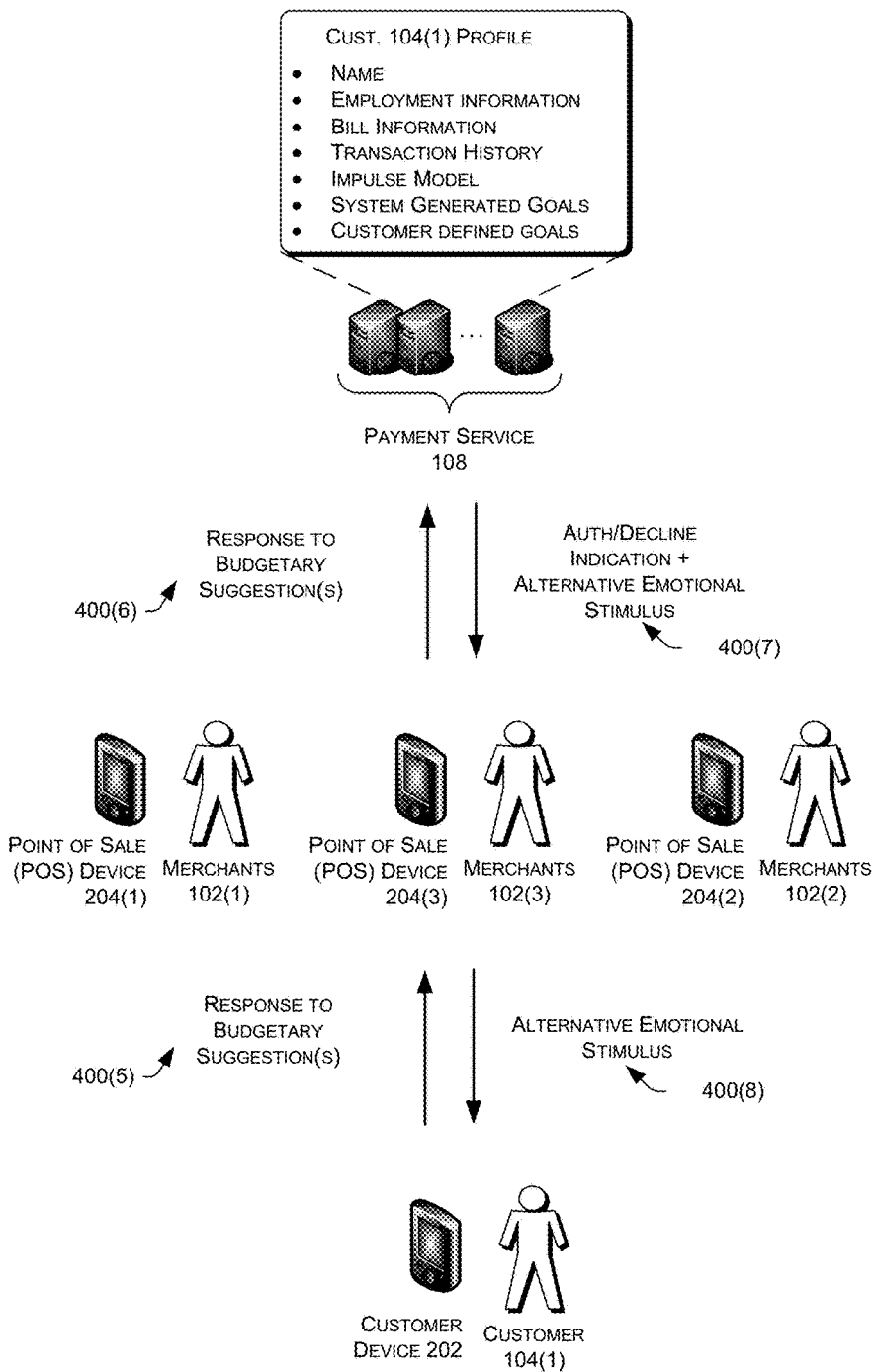

FIGS. 4A and 4B illustrates example scenarios 400 and 450 where the payment service 108 performs budgetary operations when the customer 104(1) visits a physical premises of a third merchant 102(3) to conduct a transaction with the merchant.

At 400(1), the customer 104(1) utilizes the customer device 202 to transmit a third item request including item customizations to the merchant 102(3). The POS device 204(3) of the merchant 102(3) may receive the request for the items and the item customizations. At 400(2), the POS device 204(3) may provide a request to authorize a payment instrument of the customer 104(1) to the payment service 108, along with the requested items and item customizations.

After receiving the request to authorize the payment instrument and the requested items and item customizations, the budget module 130 may analyze the requested items and items customizations as well as the transaction as a whole in view of the customer's budgetary profile to determine if any budgetary operations should be triggered. If budgetary operations are triggered, the payment service may interrupt the normal payment process flow as shown at 400(3)-400(8).

As shown at 400(3), the payment service 108 provides the budgetary suggestions to the POS device 204(3). In turn, at 400(4), the POS device 204(3) provides the budgetary suggestion to the customer device 202. Following 400(4), the customer device 202 displays the budgetary suggestion to the customer 104(1).

Turning to FIG. 4B, as shown at 400(5) and 400(6), the customer's response to the budgetary suggestion is returned to the payment service 108 through the POS device 204(3).

Upon receiving the response to the budgetary suggestions, the payment service may implement the budgetary suggestions if the user agrees and/or proceed with the authentication process. Subsequently, at 400(7), the payment service 108 provides an auth/decline authentication to the POS device 204(3). Should the customer not accept the budgetary suggestion and, for example, purchase the item which was outside the customer's budgetary profile and thereby triggered the budgetary operations, the auth/decline indication may be accompanied by a budgetary message including an alternate emotional stimulus that is provided to the customer device 202 at 400(8).

The above described process flow may be used for many of the previously described example scenarios. For example, the above described attempt to purchase a popcorn machine from a warehouse store merchant may be handled using the process flow shown in 400. In particular, the budgetary suggestion provided at 400(3) and 400(4) in that example scenario was the suggestion of postponing the purchase of the popcorn machine while also offering free delivery after the postponement period if the customer still desires the item. The customer's acceptance or rejection of the postponement corresponds to the operations of 400(5) and 400(6). Finally, the completion of the transaction including the popcorn machine (rather than postponing the purchase) may result in the output of an alternate emotional stimulus at 400(7) and 400(8). Another example communication that may be issued at 400(7) relates to the scenario in which the customer agrees to the suggested change. In particular, in some implementations, the customer may not wish the merchant to be aware of the reason for the change that results from accepting the budgetary suggestion. In such a case, the payment service may issue the instruction to the merchant to change the order in the manner of a correction of a mistake rather than as a change of intent due to budgetary concerns.

Figure 5:
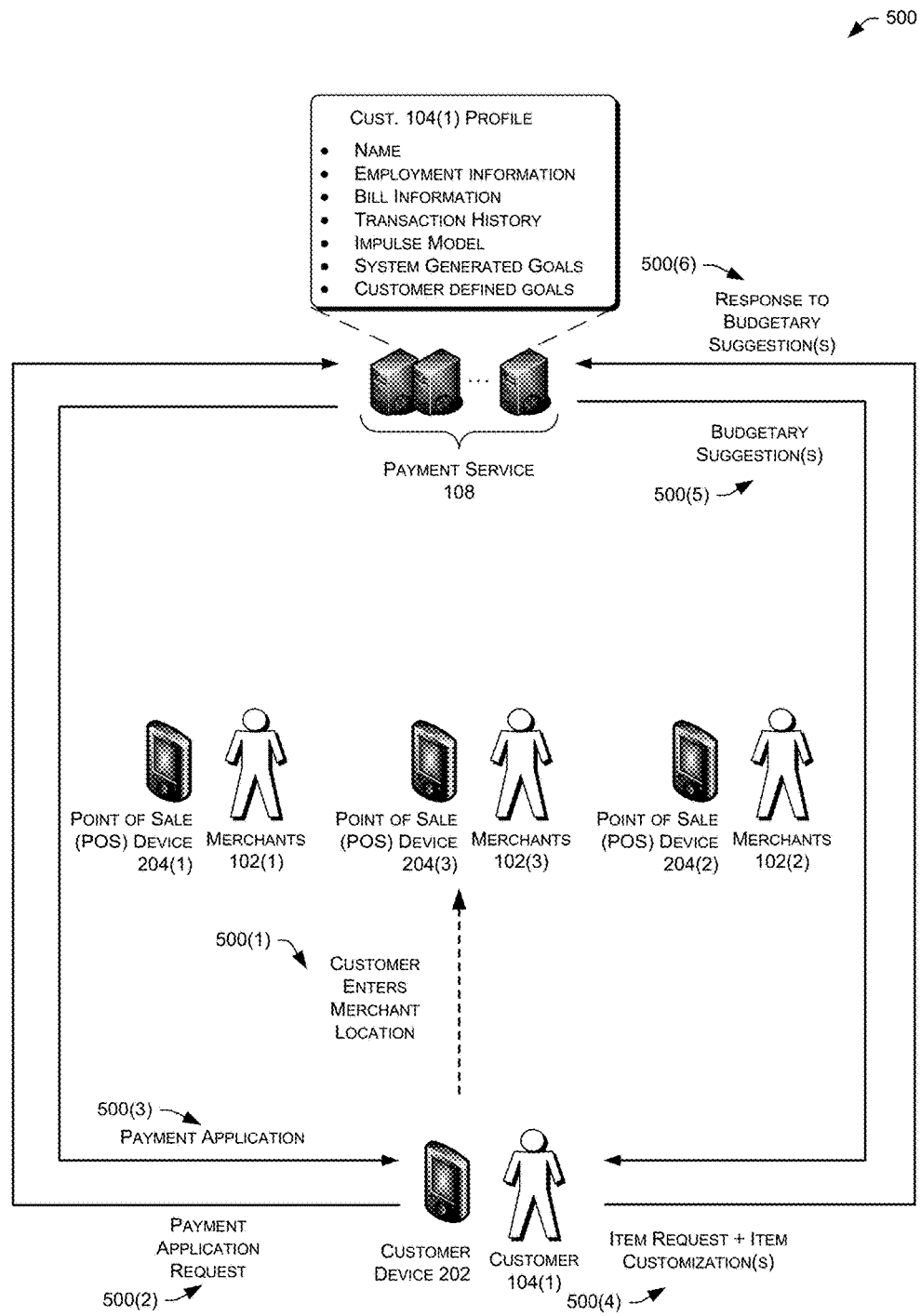
FIG. 5 illustrates a scenario where the example customer requests a payment application from the payment service, which provides an instance of the application to a device of the customer in response. The payment service may associate the instance of the application with the budgetary profile of the customer to allow for budgetary operations to be performed via the payment application when the customer interacts with the merchant.

FIG. 5 illustrates a scenario 500 where the payment service provides budgetary operations to the example customer 104(1) via a payment application after the example customer enters a merchant location at 500(1) and thereafter requests a payment application from the payment service 108.

In particular, as shown at 500(2), the customer 104(1) may utilize the customer device to request the payment application from the payments service 108. At 500(3), the payment service 108 may send an instance of the application to the customer device 202 and may associate the instance of the application with the profile of the customer 104(1) and, hence, with the budgetary profile of the customer 104(1). As such, the payment application on the customer device 202 is now associated with the impulse model of the customer, the system generated budgetary goals of the customer and the customer defined budgetary goals of the customer. The customer 104(1) may now use the payment application to order items from merchants (as shown at 500(4)), which may potentially trigger budgetary operations associated with the budgetary profile of the customer 104(1). FIG. 5, for instance, may illustrate the customer 104(1) ordering a latte with an extra shot of mocha from a local merchant using the application (or another item or item customization outside of the customer's budgetary profile).

The payment service 108 may flag the order due to the extra shot of mocha being outside the customer's budgetary goals and send budgetary suggestions to the customer device 202 at 500(5). After receiving the budgetary suggestions, the application may query the customer 104(1) as to whether the customer would like to revise the order, possibly along with an alternate emotional stimulus selected based on the customer's goals. At 500(6), the payment application may forward the response to the budgetary suggestions to the payment service 108. After receiving the response to the budgetary suggestions, the payment service may proceed in accordance with the response.

Figure 6:
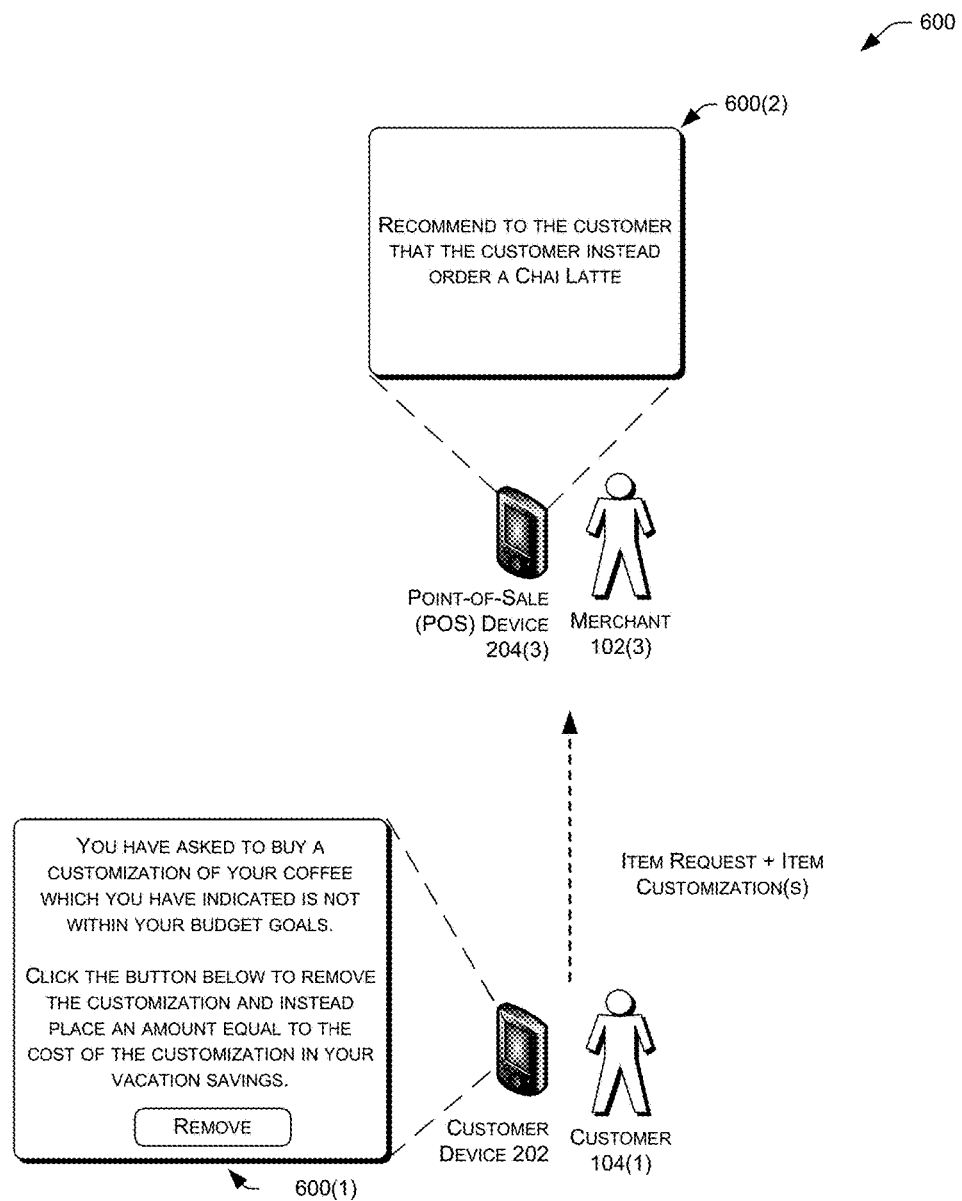
FIG. 6 illustrates an example scenario in which budgetary operations are performed for a transaction between a customer and a merchant. In particular.

FIG. 6 illustrates example user interface outputs displayed to the customer 104(1) and the merchant 102(3) during a transaction in which the customer requests items and/or item customizations outside of the budget profile of the customer.

In particular, in the illustrated example, the customer has requested a latte with a double shot of mocha. The profile of the customer 104(1) defines this purchases outside the customer's budgetary profile and, for example, a dietary profile of the customer. At 600(1), the customer is prompted with a message stating that the customization of the coffee (i.e. the double shot of mocha) is outside of the customer's budgetary goals, and provides an option for the customer to use to remove the customization from the customer's order and instead place an amount equal to the cost of the customization into a vacation savings of the customer (i.e. a savings for one of the customers budgetary goals). The determination and triggering of the operation causing the display at 600(1) may performed by interaction with the payment service 108 or by a payment application on the customer device 202.

At 600(2), an additional or alternative budgetary operation is illustrated as being provided to the merchant 102(3). Specifically, after the item request and item customization(s) are forwarded to the point of sale device 204(3), either the POS device 204(3) or the payment service 108 determines that the requested items or customizations are outside of the budgetary profile the customer and triggers a budgetary operation at the POS device 204(3). In the illustrated example, the budgetary operation is intended to upsell a chai latte as a replacement for the requested latte with the double shot of mocha. In other words, the budgetary operations disclosed herein determine that the requested latte is not within the customer's goals and that the chai latte is both within the customer's goals and an item with a higher profit margin for the merchant. In view of this, the budgetary operations recommend that the merchant attempt to convince the customer to purchase a chai latte instead of the requested latte. If the merchant successfully convinces the customer to change the order, both the customer and the merchant benefit because the customer has met the customer's budgetary goals and the merchant realizes a larger profit.

In examples discussed throughout this disclosure, information is displayed on the customer device 202 and/or the customer uses the customer device 202 to communicate with the POS devices 204 and payment service 108. Implementations are not so limited. For example, the point of sale devices 204 may include two screens and respective input means, one set for the merchant and the other set for the customer.

Figure 7:
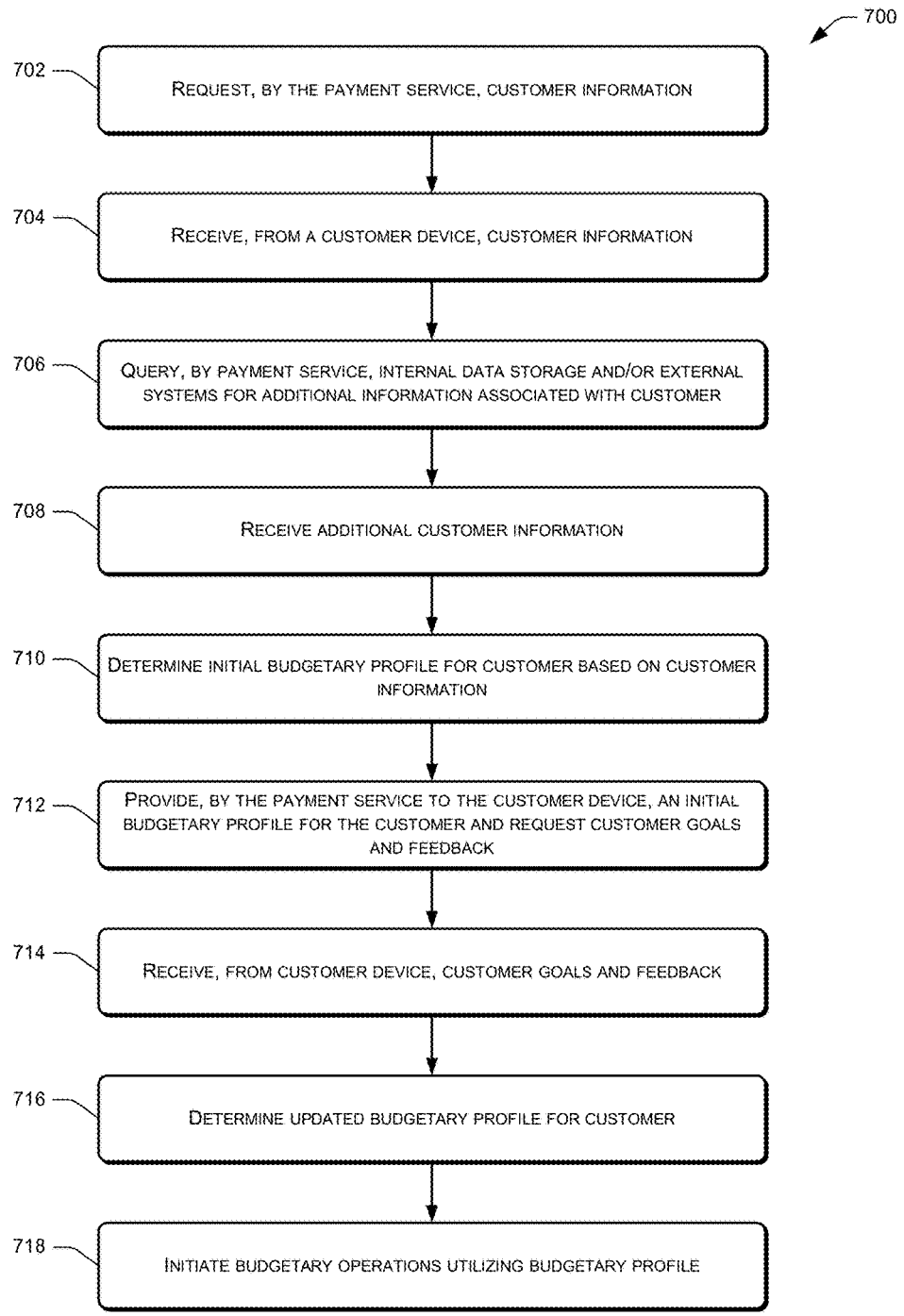
FIG. 7 illustrates a flow diagram of an example process for collecting customer information and utilizing the collected customer information, along with customer input, to generate a budgetary profile of a customer.

FIG. 7 illustrates a flow diagram of an example process 700 for creating a profile of a customer as described above with regard to FIG. 2. The process 700 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 702, the payment service makes a request for customer information. The requested customer information may be that described above with regard to FIG. 1. At 704, the payment service receives information of the customer from a customer device. At 706, the payment service queries internal data storage and external systems for additional information associated with the customer. As discussed above, the additional information may include anything from transaction history data of the customer to payroll information of the customer to information obtained from social networking services utilized by the customer. Subsequently, at 708, the payment service receives the requested additional customer information.

At 710, the payment service performs various determinations and analyses to determine an initial budgetary profile of the customer based on the received customer information.

At 712, the payment service provides the initial budgetary profile of the customer to the customer's device and requests the customer provide additional goals and feedback. At 714, the payment service receives the customer's goals and feedback from the customer device.

At 716 the payment service determines an updated budgetary profile for the customer based on the customer's goals and feedback. At 718, the payment service initiates budgetary operations utilizing the updated budgetary profile.

Figure 8:
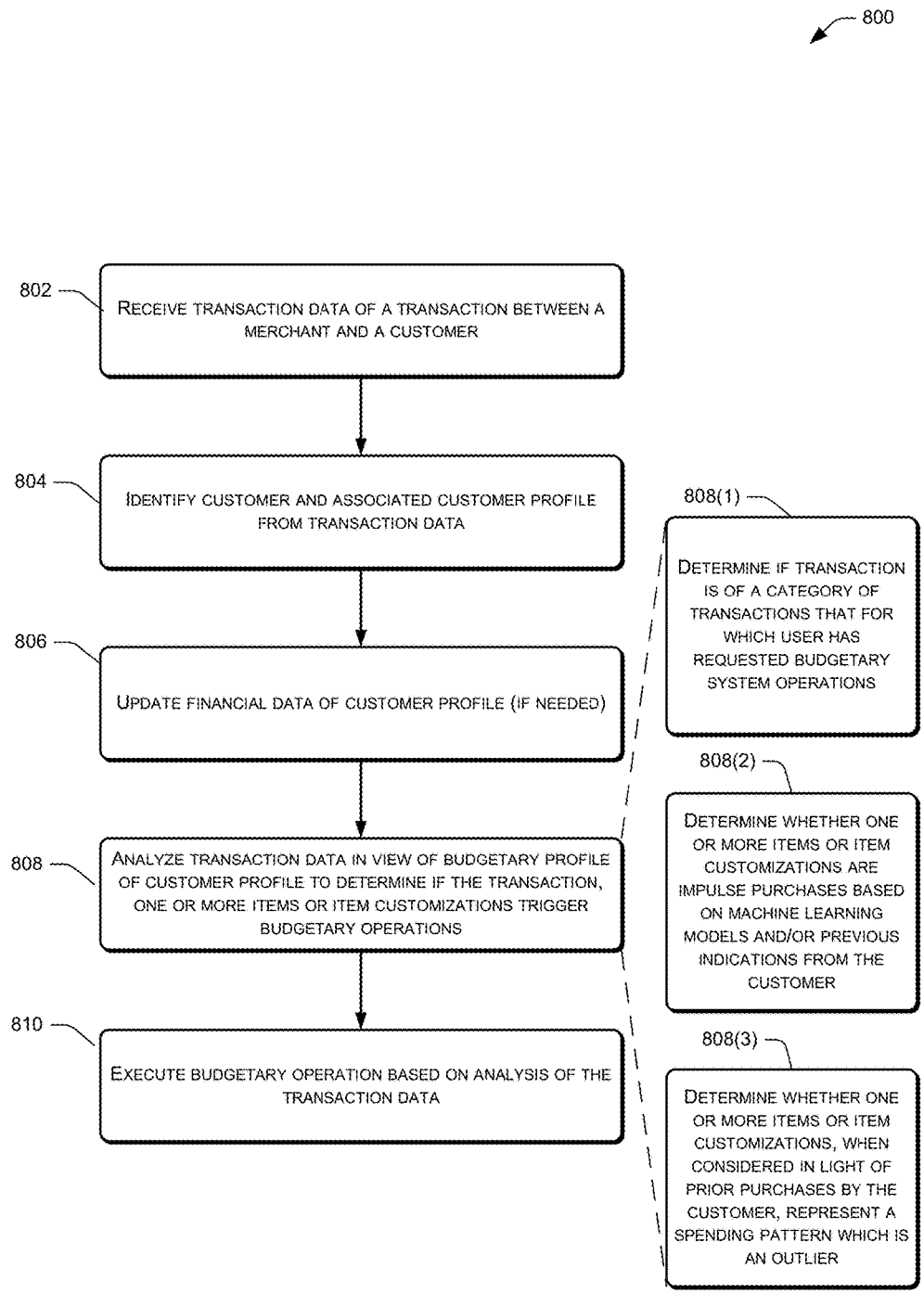
FIG. 8 illustrates a flow diagram of an example process for triggering budgetary operations based on transaction data related to an interaction of a customer with a merchant.

FIG. 8 illustrates a flow diagram of an example process 800 for performing budgetary operations utilizing a budgetary profile and transaction data of a transaction between a merchant and the customer.

At 802, the payment service (or other entity performing budgetary operations) receives transaction data of the transaction between a merchant and the customer. Depending on the particular scenario, the transaction data may be ticket data including an itemized list of items requested by the customer from the merchant, an indication that the customer has entered the premises of the merchant or begun an interaction with the merchant, data from a checkout process, and so on.

At 804, the payment service utilizes the transaction data and/or other information to identify the customer and the associated profile. At 806, the payment service operates to update the financial data of the customer's profile as needed. In particular, the budgetary operations may verify that that financial information of the customer included in the customer's profile is up-to-date. For example, the budgetary system may consider external account balances (e.g. credit card balances, checking account balances, savings account balances, etc.) to determine budgetary operations to invoke.

As the account balances may change in transactions not handled by the payment service, the payment service may update the account balances prior to determining the budgetary operations to invoke, if any.

At 808, the budgetary module of the payment service analyzes the transaction data in view of the customer's profile to determine if the transaction in general or one or more items or item customizations of the transaction trigger budgetary operations. In some examples, the budgetary module 130 may determine whether the current purchase will cause the customer to become overdrawn or otherwise impair the customer's ability to pay expenses due prior to the customer's next paycheck. In the illustrated example of FIG. 8, the budgetary module triggers budgetary operations in three other example cases shown as 808(1)-808(3).

In particular, at 808(1), the budgetary module determines if the transaction is of a category for which the user has requested budgetary operations. Examples of such categories of transaction were provided above, specifically, the examples discussed above regarding transactions initiated at a bar or dance club and transactions initiated at a restaurant.

At 808(2), the budgetary module determines whether one or more items or item customizations in the transaction data are impulse purchases or unnecessary purchases. The determination of whether an item is in an impulse purchase may be performed by one or more machine learning models and/or previous indications from the customer.

At 808(3), the budgetary module may determine whether the one or more items or item customizations, when considered in the light of prior purchases by the customer, represent a spending pattern which is an outlier. An example of such an unusual spending pattern was discussed above wherein a customer was determined to spend an amount of coffee beverages that placed the customer in the top $95^{th}$ percentile of customers.

At 810, the payment service performs any budgetary operations that were triggered at 808 based on the analysis of the transaction data. For example, in the case that budgetary module determines the purchase will likely cause the customer to become overdrawn before the customer's next paycheck at 808, the budgetary module may request the customer confirm they wish to continue. Should the customer wish to continue, the budgetary module may determine whether the customer qualifies for a payment plan with the payment service. If the customer qualifies, the budget module may prompt the customer with the budgetary projection indicating the customer will have a shortfall and offer the customer the option of the payment plan as a means to overcome the problem. Other examples of such budgetary operations have been provided throughout this disclosure.

Of course, the budgetary triggers and operations discussed throughout this disclosure are merely examples and numerous different budgetary triggers and operations and/or variations thereon would be apparent in view of this disclosure.

Figure 9:
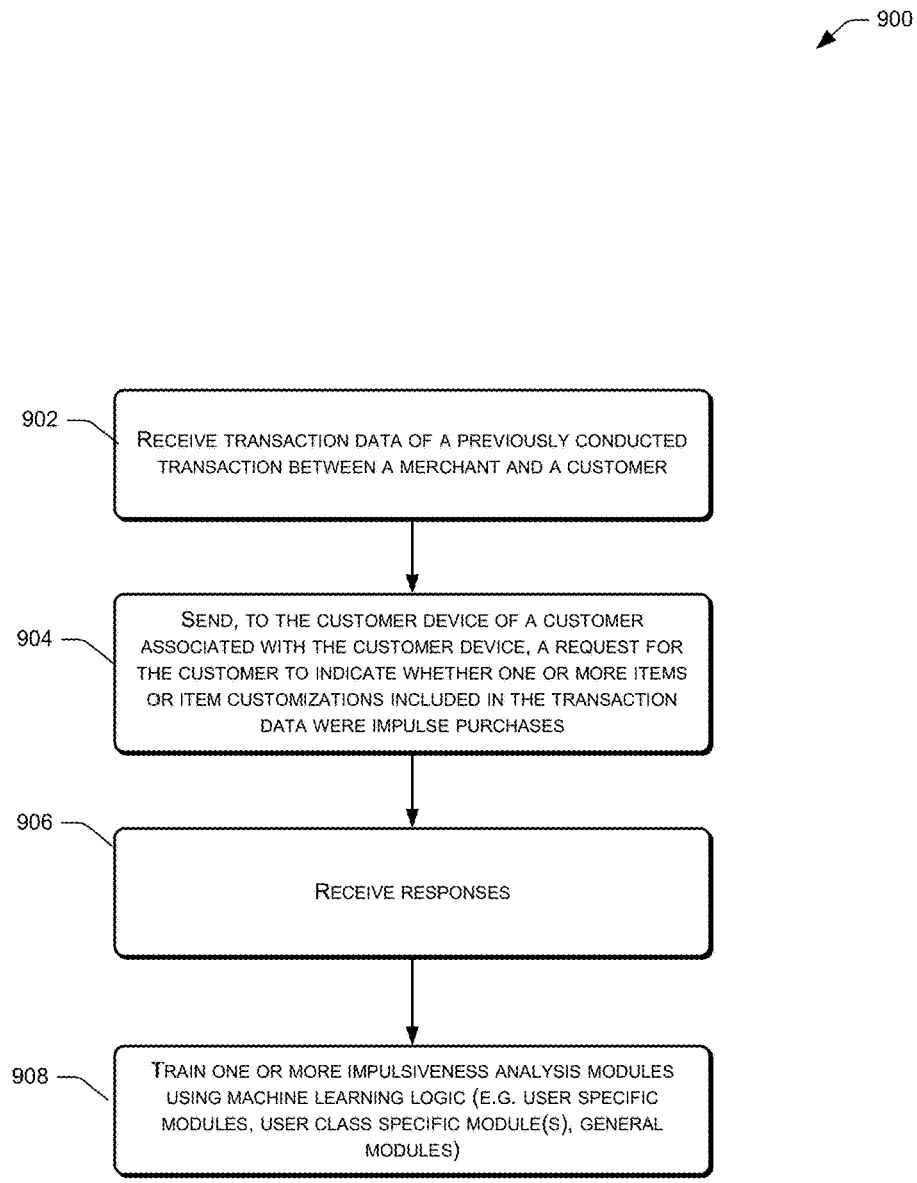
FIG. 9 illustrates a flow diagram of an example process for generating one or more impulsiveness analysis modules (also referred to herein as "impulse models") for determining whether items of the transaction are impulse purchases using machine learning algorithms that may utilize customer feedback as training data.

FIG. 9 illustrates an example flow diagram of an example process that utilizes transaction data collected from transactions of customers and merchants to generate one or more impulsiveness analysis modules (also referred to herein as impulse models) that may be used to determine whether an item or item customization included in a transaction between a customer and a merchant should be flagged as an impulse purchase.

At 902, the budgetary module may receive transaction data of a previously conducted transaction between the customer and a merchant. Based on this information, at 904, the payment service may send to the customer device of the customer a request for the customer to indicate whether one or more items or item customizations included in the transaction data were impulse purchases. For example, in an implementation in which electronic receipts are provided to the customer after transactions, the request for impulse purchase feedback may be part of the electronic receipt for the transaction. More particularly, multiple pages or tabs could be included in such an electronic receipt. As an example, such an electronic receipt may include a standard first page or tab showing data of the transaction, a second page or tab that requests feedback about the merchant and/or the purchased items (e.g. the quality of the items and/or service) and a third page or tab that requests the customer evaluate whether one or more items or item customizations purchased in the transaction were impulse purchases.

At 906, the budgetary module receives one or more responses to the request. At 908, the budgetary module may utilize one or more machine learning algorithms to train one or more impulsiveness analysis modules using the feedback as training data. Such impulsiveness analysis modules may include user specific modules, user class specific module(s), general modules and so on.

Figure 10:
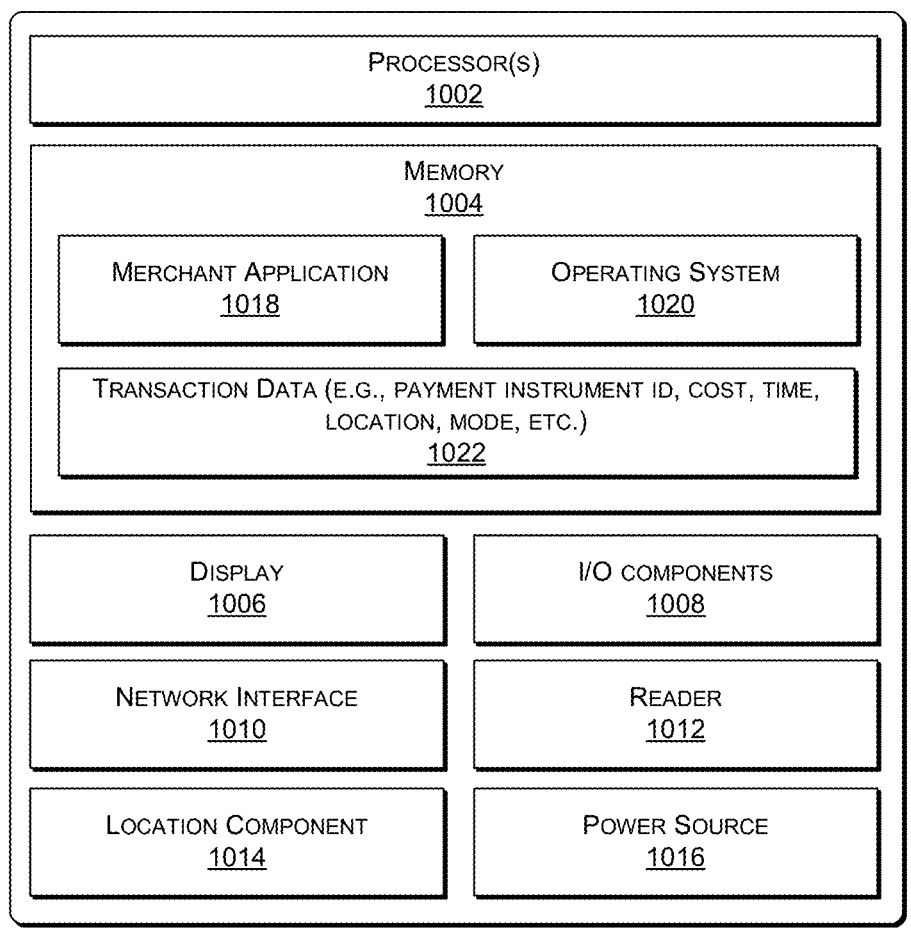
FIG. 10 illustrates select components of a POS device that merchants described herein may utilize.

Although not shown, operational feedback received from the customer's accepting or rejecting suggestions that items in transactions are impulse purchase items may further be utilized to train the impulsiveness analysis modules FIG. 10 illustrates select example components of an example POS device 1000 according to some implementations. The POS device 1000 may be any suitable type of computing device, e.g., mobile, semi-mobile, semi-stationary, or stationary. Some examples of the POS device 1000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 1000 includes at least one processor 1002, memory 1004, a display 1006, one or more input/output (I/O) components 1008, one or more network interfaces 1010, at least one card reader 1012, at least one location component 1014, and at least one power source 1016. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the memory 1004.

Depending on the configuration of the POS device 1000, the memory 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1004 may include, but is not limited to, RAM, ROM, EEPROM, flash memory, solid-state storage, magnetic disk storage, optical storage, and/or other computer-readable media technology. Further, in some cases, the POS device 1000 may access external storage, such as RAID storage systems, storage arrays, network attached storage, storage area networks, cloud storage, or any other medium that can be used to store information and that can be accessed by the processor 1002 directly or through another computing device or network. Accordingly, the memory 1004 may be computer storage media able to store instructions, modules or components that may be executed by the processor 1002. Further, when mentioned, non-transitory computer-readable media exclude media such as energy, carrier signals, electromagnetic waves, and signals per se.

The memory 1004 may be used to store and maintain any number of functional components that are executable by the processor 1002. In some implementations, these functional components comprise instructions or programs that are executable by the processor 1002 and that, when executed, implement operational logic for performing the actions and services attributed above to the POS device 1000. Functional components of the POS device 1000 stored in the memory 1004 may include a merchant application 1018, discussed above. The merchant application 1018 may present an interface on the POS device 1000 to enable the merchant to conduct transactions, receive payments, and so forth, as well as communicating with the payment service 108 for processing payments and sending transaction information. Further, the merchant application 1018 may present an interface to enable the merchant to manage the merchant's account, and the like.

Additional functional components may include an operating system 1020 for controlling and managing various functions of the POS device 1000 and for enabling basic user interactions with the POS device 1000. The memory 1004 may also store transaction data 1022 that is received based on the merchant associated with the POS device 1000 engaging in various transactions with customers, such as the example customers 104 from FIG. 1.

In addition, the memory 1004 may also store data, data structures and the like, that are used by the functional components. For example, this data may include item information that includes information about the items offered by the merchant, which may include images of the items, descriptions of the items, prices of the items, and so forth. Depending on the type of the POS device 1000, the memory 1004 may also optionally include other functional components and data, which may include programs, drivers, etc., and the data used or generated by the functional components. Further, the POS device 1000 may include many other logical, programmatic and physical components, of which those described are merely examples that are related to the discussion herein.

The network interface(s) 1010 may include one or more interfaces and hardware components for enabling communication with various other devices over the network or directly. For example, network interface(s) 1010 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the POS device 1000 may include the display 1006 mentioned above. Depending on the type of computing device used as the POS device 1000, the display 1006 may employ any suitable display technology. For example, the display 1006 may be a liquid crystal display, a plasma display, a light emitting diode display, an OLED (organic light-emitting diode) display, an electronic paper display, or any other suitable type of display able to present digital content thereon. In some examples, the display 1006 may have a touch sensor associated with the display 1006 to provide a touchscreen display configured to receive touch inputs for enabling interaction with a graphic interface presented on the display 1006. Accordingly, implementations herein are not limited to any particular display technology. Alternatively, in some examples, the POS device 1000 may not include the display 1006, and information may be present by other means, such as aurally.

The I/O components 1008, meanwhile, may include speakers, a microphone, a camera, and various user controls (e.g., buttons, a joystick, a keyboard, a keypad, etc.), a haptic output device, and so forth.

In addition, the POS device 1000 may include or may be connectable to a payment instrument reader 1012. In some examples, the reader 1012 may plug in to a port in the merchant device, such as a microphone/headphone port, a data port, or other suitable port. In other instances, the reader 1012 is integral with the entire POS device 1000. The reader may include a read head for reading a magnetic strip or chip of a payment card, and further may include encryption technology for encrypting the information read from the magnetic strip. Alternatively, numerous other types of card readers may be employed with the POS devices 1000 herein, depending on the type and configuration of a particular POS device 1000.

The location component 1014 may include a GPS device able to indicate location information, or the location component 1014 may comprise another other location-based sensor. The POS device 1000 may also include one or more additional sensors (not shown), such as an accelerometer, gyroscope, compass, proximity sensor, and the like. Additionally, the POS device 1000 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   a first point-of-sale (POS) device operated by a first merchant and configured to receive payment information from a payment instrument of a customer of the first merchant using a payment instrument reader and further configured to process, at least in part, a payment for one or more items purchased by the customer in a transaction with the first merchant; and
   a payment service system that processes, at least in part, payment transactions at the first POS device and a second POS device operated by a second merchant, the payment service system including:
   one or more processors; and
   one or more computer-readable media storing instructions executable by the one or more processors, wherein the instructions program the one or more processors to perform acts comprising:
   receiving information of the customer;
   determining a budgetary goal of the customer;
   receiving, from the first POS device, ticket information for the transaction of the customer with the first merchant including the one or more items to be purchased by the customer;

accessing feedback data associated with one or more previous purchases of the customer at the second POS device, the feedback data indicating one or more other items that were impulse purchase items;

determining, by a trained impulsiveness analysis module, that a particular item of the one or more items to be purchased by the customer is an impulse purchase, wherein the determining that the particular item is an impulse purchase is based at least in part on:
  the information of the customer;
  the budgetary goal of the customer; and
  the feedback data;

prior to a payment authorization for the transaction, prompting the customer with an alternative option that is an alternative to purchasing the particular item determined to be an impulse purchase, the prompt including a stimulus associated with the budgetary goal of the customer, and the alternative option comprising removing the particular item determined to be an impulse purchase from the ticket information and transferring, from a payment source of the customer, an amount of funds equal to a cost of the particular item determined to be an impulse purchase to a savings account associated with the budgetary goal of the customer;

receiving approval of the alternative option from the customer;

altering the ticket information in accordance with the alternative option; and processing the payment for a cost of the transaction and transferring the amount of funds equal to the cost of the particular item determined to be an impulse purchase to the savings account associated with the budgetary goal of the customer.

2. A system as recited in claim 1, wherein the acts further comprise the trained impulsiveness analysis module comprises at least one of:
  a customer specific impulse module that is based on feedback received from the customer; or
  a non-specific impulse module that is based on feedback received from a plurality of customers.

3. A system as recited in claim 1, wherein the budgetary goal is a first budgetary goal, the ticket information is first ticket information, the transaction is a first transaction, and the acts further comprise:
  determining a second budgetary goal of the customer;
  receiving second ticket information for a second transaction of the customer;
  determining, based on the second budgetary goal of the customer and second ticket information, a second budgetary operation to perform based on the second transaction being a type of transaction associated with the second budgetary operation; and
  performing the second budgetary operation with regard to the second transaction of the customer, the second budgetary operation comprising automatically setting a spending limit for the second transaction.

4. A system as recited in claim 1, wherein the ticket information is first ticket information, the transaction is a first transaction, the information of the customer includes transaction information for a plurality of previous transactions of the customer, and the acts further comprise:
  receiving second ticket information for a second transaction of the customer;
  determining, based on the transaction information for the plurality of previous transactions of the customer and the second ticket information, a spending pattern of the customer with regard to a type of item included in the second ticket information;
  comparing the spending pattern of the customer with regard to the type of item to spending patterns of a plurality of other customers to determine a ranking of the spending pattern of the customer among the other customers; and
  in response to the ranking of the customer being above a threshold rank, performing a second budgetary operation with regard to the second transaction of the customer, the second budgetary operation comprising suggesting the customer reduce the amount of the type of item the customer purchases.

5. One or more non-transitory computer-readable media storing instructions executable by one or more processors of a payment service system that processes payment transactions at a first point-of-sale (POS) device and a second POS device operated by a first merchant and a second merchant, respectively, wherein the instructions program the one or more processors to perform acts comprising:
  determining a budgetary goal of a customer;
  receiving interaction information for an interaction of the customer with the first merchant, wherein the interaction information comprises ticket information for a transaction of the customer at the first POS device including one or more items to be purchased by the customer;
  accessing feedback data associated with one or more previous purchases of the customer at the second POS device, the feedback data indicating one or more other items that were impulse purchase items;
  determining, using one or more trained impulsiveness analysis modules and based at least in part on the budgetary goal and the feedback data, that a particular item of the one or more items to be purchased by the customer is an impulse purchase;
  determining, based at least in part on the determining that the particular item is an impulse purchase, a budgetary operation to perform with regard to the interaction of the customer with the first merchant, wherein the budgetary operation includes one or more of transferring funds, altering the ticket information, or setting a spending limit; and
  performing the budgetary operation with regard to the interaction of the customer with the first merchant.

6. A non-transitory computer-readable media as recited in claim 5, wherein the acts further comprise:
  receiving information of the customer;
  wherein the determining that the particular item is an impulse purchase is further based at least in part on the information of the customer.

7. A non-transitory computer-readable media as recited in claim 5, wherein the one or more trained impulsiveness analysis modules comprises at least one of:
  a customer specific impulse module that is based on feedback received from the customer; or
  a non-specific impulse module that is based on feedback received from a plurality of customers.

8. A non-transitory computer-readable media as recited in claim 7, wherein the acts further comprise:

prompting the customer to provide an evaluation of whether an item from a previous transaction was an impulse purchase;

receiving the evaluation from the customer; and adapting, using machine learning, at least one of the customer specific impulse model or the non-specific impulse model based on the evaluation.

9. A non-transitory computer-readable media as recited in claim 5, the acts further comprising:

prior to processing the payment for a cost of the transaction, prompting the customer with an alternative option that is an alternative to purchasing the particular item determined to be an impulse purchase, the alternative option comprising removing the particular item determined to be an impulse purchase from the ticket information;

receiving approval of the alternative option from the customer; and processing the payment for the cost of the transaction;

wherein the budgetary operation comprises altering the ticket information in accordance with the alternative option.

10. A non-transitory computer-readable media as recited in claim 5, the acts further comprising:

prior to processing the payment for a cost of the transaction, prompting the customer with an alternative option that is an alternative to purchasing the particular item determined to be an impulse purchase, the alternative option comprising removing the particular item determined to be an impulse purchase from the ticket information and transferring, from a payment source of the customer, an amount of funds equal to a cost of the particular item determined to be an impulse purchase to a savings account associated with the budgetary goal of the customer;

receiving approval of the alternative option from the customer; and processing the payment for the cost of the transaction; wherein:

the budgetary operation comprises the transferring funds and the altering the ticket information;

the transferring funds comprises transferring the amount of funds equal to the cost of the particular item determined to be an impulse purchase to the savings account associated with the budgetary goal of the customer; and the altering the ticket information comprises altering the ticket information in accordance with the alternative option.

11. A non-transitory computer-readable media as recited in claim 5, the acts further comprising:

receiving information of the customer including a dietary goal of the customer, wherein:

the determining that the particular item is an impulse purchase comprises:

determining that the particular item is an impulse purchase that is outside of the dietary goal of the customer; and the determining the budgetary operation to perform with regard to the interaction of the customer with the first merchant is based at least in part on the determining that the particular is an impulse purchase that is outside of the dietary goal of the customer;

prior to processing the payment for a cost of the transaction, prompting the customer with an alternative option that is an alternative to purchasing the particular item determined to be an impulse purchase, the alternative option comprising removing the particular item determined to be an impulse purchase from the ticket information and adding another item that is within the budgetary goal of the customer and the dietary goal of the customer;

receiving approval of the alternative option from the customer; and processing the payment for the cost of the transaction, wherein the budgetary operation comprises altering the ticket information in accordance with the alternative option.

12. A non-transitory computer-readable media as recited in claim 5, wherein the determining the budgetary operation to perform with regard to the interaction of the customer with the first merchant is further based at least in part on an item customization of an item requested by the customer from the first merchant as part of the interaction.

13. A non-transitory computer-readable media as recited in claim 5, wherein the acts further comprise:

determining, based on the interaction information and the budgetary goal of the customer, that the interaction of the customer with the first merchant is a type of interaction associated with the budgetary operation, wherein the determining the budgetary operation to perform with regard to the interaction of the customer with the first merchant is further based at least in part on the determining the interaction of the customer with the first merchant is the type of interaction associated with the budgetary operation.

14. A non-transitory computer-readable media as recited in claim 5, wherein the acts further comprise:

determining the ticket information includes a request by the customer to purchase items for other customers;

prior to a payment authorization for the transaction, prompting the customer with an alternative option that is an alternative to purchasing the items for one or more other customers, the alternative option comprising prompting at least one of the other customers to pay a portion of a cost of the transaction;

receiving approval of the alternative option from the customer; and prompting a customer device of a particular other customer of the other customers, the particular other customer to pay a portion of the cost of the transaction.

15. A non-transitory computer-readable media as recited in claim 5, wherein the budgetary operation comprises the setting the spending limit, and wherein the setting the spending limit comprises automatically setting the spending limit for a transaction associated with the interaction.

16. A computer-readable media as recited in claim 15, wherein the budgetary operation further comprises automatically informing the first merchant of the spending limit.

17. A method comprising:

determining, by at least one computing device of a payment service, a budgetary profile of a customer, wherein the payment service processes payment transactions at a first point-of-sale (POS) device and a second POS device operated by a first merchant and a second merchant, respectively;

receiving, by the at least one computing device of the payment service, interaction information for an interaction of the customer with a merchant, wherein the interaction information comprises ticket information for a transaction of the customer at the first POS device including one or more items to be purchased by the customer;

accessing feedback data associated with one or more previous purchases of the customer at the second POS device, the feedback data indicating one or more other items that were impulse purchase items;

determining, using one or more trained impulsiveness analysis modules and based at least in part on the budgetary profile of the customer and the feedback data, that a particular item of the one or more items to be purchased by the customer is an impulse purchase;

determining, by the at least one computing device of the payment service and based at least in part on the determining that the particular item of the one or more items to be purchased by the customer is an impulse purchase, a budgetary operation to perform with regard to the interaction of the customer with the first merchant; and performing, by the at least one computing device of the payment service, the budgetary operation with regard to the interaction of the customer with the first merchant, wherein the budgetary operation includes one or more of transferring funds, altering the ticket information, or setting a spending limit.

18. A method as recited in claim 17, wherein the method further comprises:

receiving information of the customer;

wherein the determining that the particular item is an impulse purchase is further based at least in part on the information of the customer.

19. A method as recited in claim 17, further comprising:

determining, based on the interaction information and the budgetary profile of the customer, that the interaction of the customer with the first merchant is a type of interaction associated with the budgetary operation, wherein the determining the budgetary operation to perform with regard to the interaction of the customer with the first merchant is further based at least in part on the determining the interaction of the customer with the first merchant is the type of interaction associated with the budgetary operation.

20. A method as recited in claim 17, wherein the determining the budgetary operation to perform with regard to the interaction of the customer with the first merchant is further based at least in part on one of an item or an item customization requested by the customer from the first merchant as part of the interaction.

* * * * *